United States Patent
Hou et al.

(10) Patent No.: US 9,207,769 B2
(45) Date of Patent: Dec. 8, 2015

(54) PROCESSING METHOD AND ELECTRONIC DEVICE

(71) Applicant: Lenovo (Beijing) Co., Ltd., Beijing (CN)

(72) Inventors: Xinru Hou, Beijing (CN); Shifeng Peng, Beijing (CN)

(73) Assignee: Lenovo (Beijing) Co., Ltd., Beijing (CN)

( * ) Notice: Subject to any disclaimer, the term of this patent is extended or adjusted under 35 U.S.C. 154(b) by 122 days.

(21) Appl. No.: 14/107,456

(22) Filed: Dec. 16, 2013

(65) Prior Publication Data

US 2014/0168072 A1    Jun. 19, 2014

(30) Foreign Application Priority Data

Dec. 17, 2012  (CN) .......................... 2012 1 0548757
Dec. 17, 2012  (CN) .......................... 2012 1 0550142

(51) Int. Cl.
| | |
|---|---|
| G09G 5/00 | (2006.01) |
| G06F 3/01 | (2006.01) |
| G06F 3/038 | (2013.01) |
| G06T 15/00 | (2011.01) |
| G06F 3/042 | (2006.01) |

(52) U.S. Cl.
CPC ................ *G06F 3/017* (2013.01); *G06F 3/016* (2013.01); *G06F 3/038* (2013.01); *G06F 3/0421* (2013.01); *G06T 15/005* (2013.01)

(58) Field of Classification Search
None
See application file for complete search history.

(56) References Cited

U.S. PATENT DOCUMENTS

| | | | |
|---|---|---|---|
| 9,030,487 B2 * | 5/2015 | Im et al. .......................... | 345/619 |
| 2013/0190089 A1 * | 7/2013 | Wilson et al. .................... | 463/36 |
| 2015/0062004 A1 * | 3/2015 | Rafii .............................. | 345/156 |

* cited by examiner

*Primary Examiner* — Muhammad N Edun
(74) *Attorney, Agent, or Firm* — Harness, Dickey & Pierce, P.L.C.

(57) ABSTRACT

A processing method and an electronic device are provided. The processing method includes: acquiring a first image which contains an instruction object by the image acquisition unit, wherein the instruction object is directional; analyzing the first image and acquiring first parameter information represented by the instruction object, where the first parameter information indicates a direction of the instruction object; generating a first instruction based on the first parameter information; and executing, in response to the first instruction, an operation corresponding to the instruction object.

15 Claims, 13 Drawing Sheets

PROCESSING METHOD AND ELECTRONIC DEVICE

CROSS-REFERENCES TO RELATED APPLICATIONS

The present application claims the priority to Chinese Patent Application No. 201210548757.5, entitled "PROCESSING METHOD, DEVICE AND APPARATUS", filed with the Chinese State Intellectual Property Office on Dec. 17, 2012, and the priority to Chinese Patent Application No. 201210550142.6, entitled "METHOD FOR ADJUSTING FOCUSING POINT AND ELECTRONIC DEVICE", field with the Chinese State Intellectual Property Office on Dec. 17, 2012, which are incorporated herein by reference in their entireties.

TECHNICAL FIELD

The present disclosure relates to the field of optics and computer, and particularly to a processing method and an electronic device.

BACKGROUND

With the continuous development of intelligent terminals, more and more people achieve control over electronic device by video control signals acquired by acquisition device such as cameras.

For example, many TV sets, intelligent glasses have the function to control the current display interface by the acquired video control signals.

Furthermore, the focusing of the electronic device can be controlled by the video control signals.

SUMMARY

A processing method and an electronic device are provided in embodiments of the present disclosure, to control the electronic device effectively.

According to an embodiment of the present disclosure, it is provided a processing method, applied to an electronic device comprising an image acquisition unit, including:

acquiring a first image which contains an instruction object by the image acquisition unit, wherein the instruction object is directional;

analyzing the first image and obtaining first parameter information represented by the instruction object, wherein the first parameter information indicates a direction of the instruction object;

generating a first instruction based on the first parameter information; and executing, in response to the first instruction, an operation corresponding to the instruction object.

Where the instruction object is a hand.

Where the executing an operation corresponding to the instruction object includes:

keeping executing the operation corresponding to a gesture of the hand.

Where the keeping executing the operation corresponding to the gesture includes: keeping executing the operation corresponding to the gesture until the gesture acquired by the image acquisition unit changes.

The method further includes:

acquiring second parameter information represented by a gesture of the hand, wherein the second parameter information indicates the number of gestures with the same first parameter information;

where the generating a first instruction based on the first parameter information comprises: generating a first instruction based on the first parameter information and the second parameter information; and the executing, in response to the first instruction, an operation corresponding to the instruction object comprises: executing, in response to the first instruction, the operation corresponding to the gesture at a speed corresponding to the second parameter information.

where the electronic device includes a storage device, the storage device stores a preset gesture, and the preset gesture has corresponding first parameter information;

the analyzing the image includes: comparing a gesture of the hand with the preset gesture stored in the storage device;

the gesture of the hand matches the preset gesture stored in the storage device, acquiring the first parameter information corresponding to the preset gesture.

where the electronic device further includes a storage device, the storage device stores a preset direction interval;

the analyzing the image includes: analyzing a gesture of the hand according to the preset direction interval stored in the storage device.

Where the analyzing the image includes: acquiring a boundary of a gesture of the hand and a bump direction of the boundary of the gesture; and the acquiring the first parameter information represented by the instruction object comprises: acquiring the first parameter information represented by the gesture according to the bump direction of the boundary.

Where the generating a first instruction based on the first parameter information comprises: determining a first direction corresponding to the instruction object according to the direction of the instruction object, and a first target corresponding to the first direction in an image acquisition area of the image acquisition unit; and executing, in response to the first instruction, an operation corresponding to the instruction object comprises: adjusting a focusing point of the image acquisition unit to the first target.

Where the instruction object is a hand.

Where the determining a first direction corresponding to the instruction object according to the direction of the instruction object includes:

acquiring gesture information of the hand; and determining a direction where a line extending from the middle of two eyes of a person to a first end of a gesture corresponding to the gesture information points as the first direction.

Where before determining a first target corresponding to the first direction in the image acquisition area of the image acquisition unit, the method further includes:

determining an extended line to a line extending from a middle of two eyes of a person to a first end of the gesture corresponding to the gesture information; and determining the number of shooting targets that intersect with the extended line in the image acquisition area;

the determining a first target corresponding to the first direction in the image acquisition area of the image acquisition unit includes:

in the case where the number of shooting targets is more than one, determining the shooting target that is closets to the electronic device from the shooting targets as the first target.

Where the determining a first target corresponding to the first direction in an image acquisition area of the image acquisition unit includes:

determining at least twice within a first period of time shooting target corresponding to the first direction in the image acquisition area of the image acquisition unit; and selecting one of the determined shooting targets as the first target.

Where the selecting one of the determined shooting targets as the first target includes:

determining the shooting target which is most frequently determined within the first period of time as the first target.

Where after the adjusting the focusing point of the image acquisition unit to the first target, the method further includes:

previewing a shooting for the image acquisition area or taking a picture.

According to an embodiment of the present disclosure, it is provided an electronic device including an image acquisition unit, the electronic device further includes:

an acquisition module, configured to acquire a first image containing an instruction object, wherein the instruction object is directional;

analysis module, configured to analyze the first image, and acquire first parameter information represented by the instruction object, where the first parameter information indicates a direction of the instruction object;

an instruction generating module, configured to generate a first instruction based on the first parameter information; and an execution module, configured to execute, in response to the first instruction, an operation corresponding to the instruction object.

Where the instruction object is a hand.

Where the analysis module is further configured to acquire second parameter information represented by a gesture of the hand, wherein the second parameter indicates the number of gestures with the same first parameter information;

the instruction generation module is configured to generate the first instruction based on the first parameter information and the second parameter information;

the execution module is configured to execute, in response to the first instruction, the operation corresponding to the gesture at a speed corresponding to the second parameter information.

The electronic device further includes: a storage device, configured to storage a preset gesture, where the preset gesture has a corresponding first parameter information;

where the analysis module is configured to compare the gesture of the hand with the preset gesture stored in the storage device; the gesture of the hand matches the preset gesture stored in the storage device, acquire the first parameter information corresponding to the preset gesture matched to the gesture.

The electronic device further includes: a storage device, configured to a preset direction interval;

the analysis module is configured to analyze the gesture acquired by the acquisition module according to the preset direction interval.

Where the instruction generation module includes: a first direction determination sub-module, configured to determine a first direction corresponding to the instruction object according to direction of the instruction object;

Where the instruction generation module is configured to determine a first target corresponding to the first direction in an image acquisition area of the image acquisition unit;

the execution module is configured to adjust a focusing point of the image acquisition unit to the first target.

Where the instruction object is a hand.

Where the analysis module is configured to acquire gesture information of the hand; and determine a direction where a line extending from the middle of two eyes of a person to a first end of a gesture corresponding to the gesture information points as the first direction.

where the instruction generation module is configured to determine an extended line to a line extending from a middle of two eyes of a person to a first end of the gesture corresponding to gesture information; and determine the number of shooting targets that intersect with the extended line in the image acquisition area.

Where the instruction generation module includes:

a first determination sub-module, configured to determine the extended line to the line extending from the middle of the two eyes of the person to the first end of the gesture corresponding to the gesture information;

a second determination sub-module, configured to determine the number of the shooting targets that intersect with the extended line in the image acquisition area; and a third determination sub-module, configured to determine the shooting target that is closest to the electronic device as the first target, from the shooting targets, in the case where the number of shooting targets is more than 1.

Where the instruction generation module further includes:

a second determination sub-module, configured to determine, at least twice within a first period of time, shooting target corresponding to the first direction in the image acquisition area of the image acquisition unit; and a third determination sub-module, configured to select one of the determined shooting targets as the first target.

Where the third determination sub-module is configured determine the shooting target which is most frequently determined within the first period of time as the first target.

The electronic device further includes a shooting module, configured to preview a shooting for the image acquisition area or take a picture.

In the case where the technical solution is applied to controlling the display interface of the electronic device, only the directional gesture in a specific region of space can trigger corresponding operation, and therefore a wrong operation may not be easily incurred.

In the case where the technical solution is applied to controlling the camera of the electronic device, not only the shooting quality is improved due to the capability of focusing adjustment, but also enhancing the shooting efficiency for the user to obtain his favorable image as soon as possible, which therefore improves the user experience.

DETAILED DESCRIPTION

The technical solutions in the embodiments of the present disclosure will be described clearly and completely hereinafter in conjunction with the drawings in the embodiments of the present disclosure. Apparently, the described embodiments are only a part but not all of the embodiments of the present disclosure. All the other embodiments can be obtained by those skilled in the art without creative effort on the basis of the embodiments of the present disclosure, which fall within the scope of protection of the present disclosure.

The First Embodiment

Figure 1:
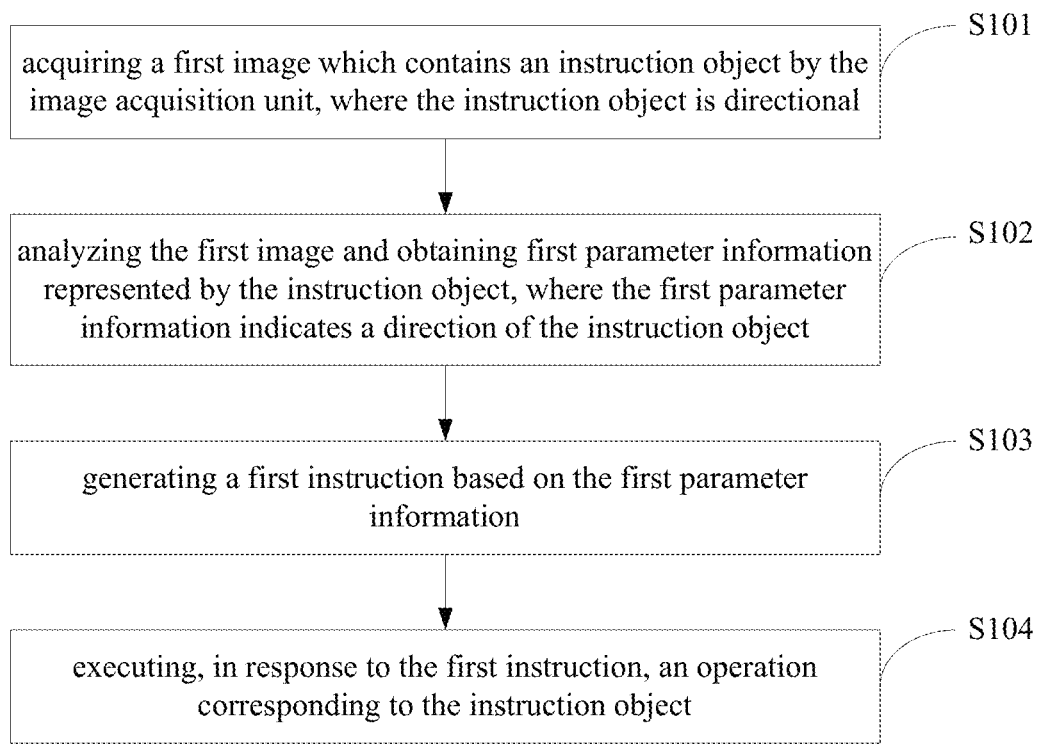
FIG. 1 a schematic flow chart of a processing method according to an embodiment of the present disclosure.

Referring to FIG. 1, it is provided a processing method applied to an electronic device, the method includes steps 101 to 104.

Step 101: acquiring a first image which contains an instruction object by the image acquisition unit, where the instruction object is directional.

Step 102: analyzing the first image and obtaining first parameter information represented by the instruction object, where the first parameter information indicates a direction of the instruction object.

Step 103: generating a first instruction based on the first parameter information.

Step 104: executing, in response to the first instruction, an operation corresponding to the instruction object.

According to the processing method provided in the embodiment, the first image acquired by the image acquisition unit is analyzed, the direction of the instruction object contained in the first image is acquired, and the corresponding process is performed according to the direction of the instruction object.

Figure 2:
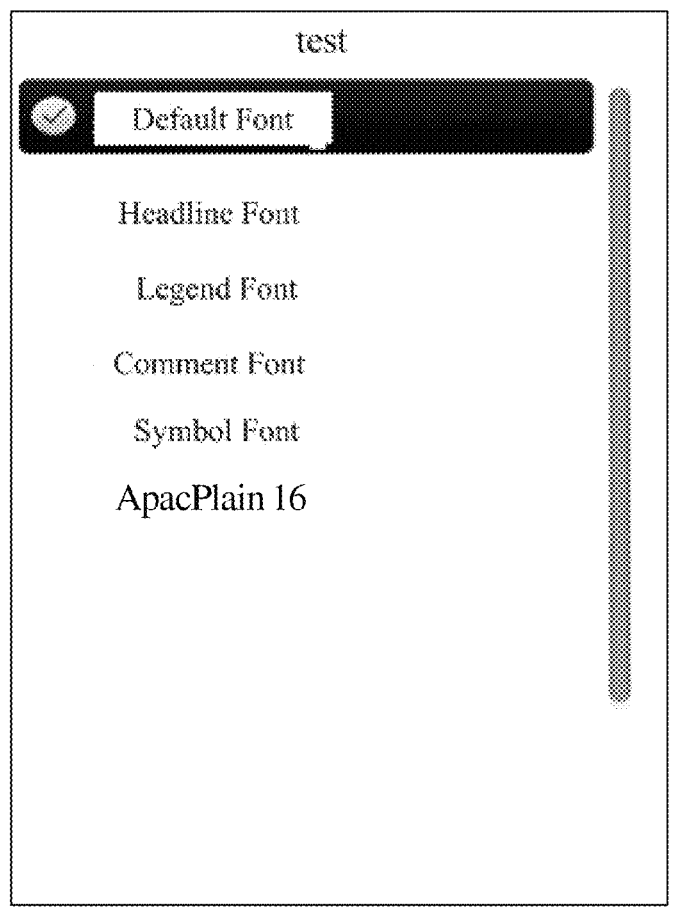
FIG. 2 is a display interface in the prior art.

For example, the technical solution provided in the embodiment may be applied to controlling the display interface of an electronic device. At present in the prior art, control over the current display interface by the acquired video control signals is usually achieved by acquiring dragging motions in the video region, and controlling the current display interface to zoom out, zoom in, or scroll upward, downward, leftward or rightward according to the dragging motions. For example, the scroll bar in the display interface as shown in FIG. 2 may be controlled to scroll to a corresponding direction by motion of dragging upward or dragging downward. However, as in this way the dragging motion is taken as the control signal, hence any motion in the video area is likely to be considered as a control signal, which may easily lead to a wrong operation.

The Second Embodiment

Figure 3:
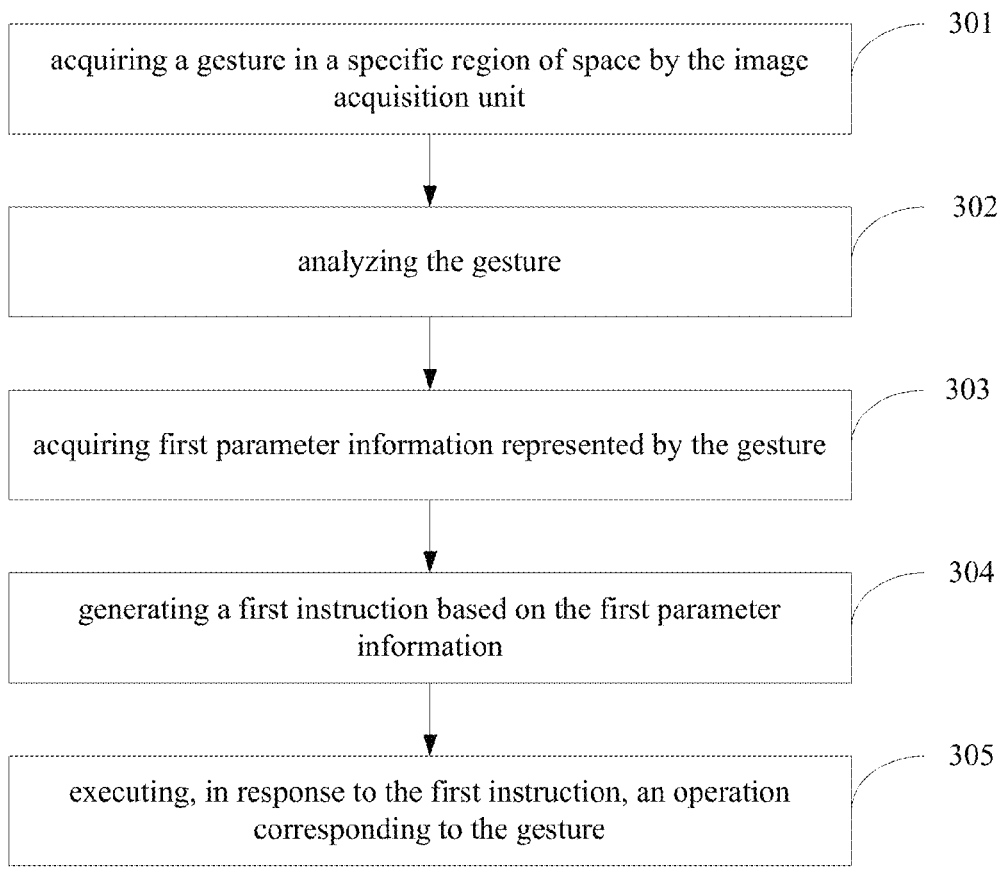
FIG. 3 is a schematic flow chart of a processing method according to an embodiment provided in the present disclosure.

Referring to FIG. 3, a processing method is provided in an embodiment of the present disclosure. In this embodiment, the method may be applied to an electronic device, and the electronic device includes an image acquisition unit, the method including steps 301 to 305.

S301: acquiring a gesture in a specific region of space by the image acquisition unit, where, the gesture is directional, and the specific region of space refers to a video region where video signals can be acquired by the image acquisition unit.

S302: analyzing the gesture.

S303: acquiring first parameter information represented by the gesture, where the first parameter information is used to indicate the direction of the gesture.

S304: generating a first instruction based on the first parameter information, where, the first instruction may be an instruction corresponding to the same or the opposite direction of the gesture indicated by the first parameter information.

S305: executing, in response to the first instruction, an operation corresponding to the gesture.

Where, the electronic device may be a device which includes an image acquisition unit, such as TV sets or intelligent glasses, and the image acquisition unit is able to acquire video signals, such as cameras.

It can be known from the above technical solutions that, in this embodiment, a directional gesture is acquired in a specific region of space by an image acquisition unit; first parameter information is acquired where a direction is indicated by the gesture; and an operation corresponding to the gesture is executed in response to a first instruction generated by the first parameter information. It can be seen in the present disclosure that, in executing an operation corresponding to the gesture, only the directional gesture in a specific region of space can trigger corresponding operation, and therefore a wrong operation may not be easily incurred.

Figure 4:
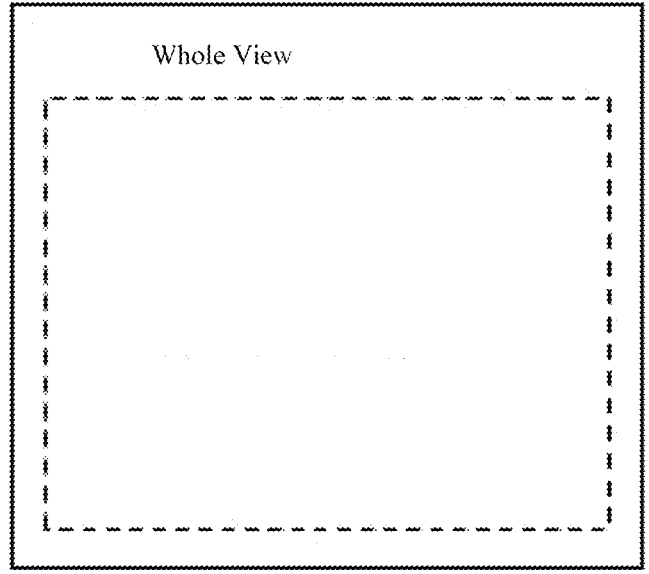
FIG. 4 is a schematic diagram of a specific region of space.
Figure 5:
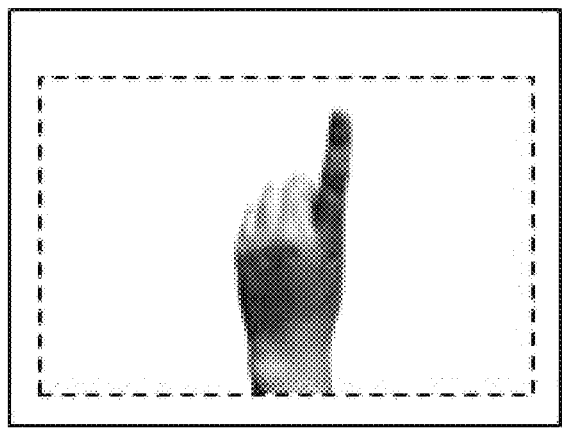
FIG. 5 is a directional diagram of upward gesture in a specific region of space.
Figure 6:
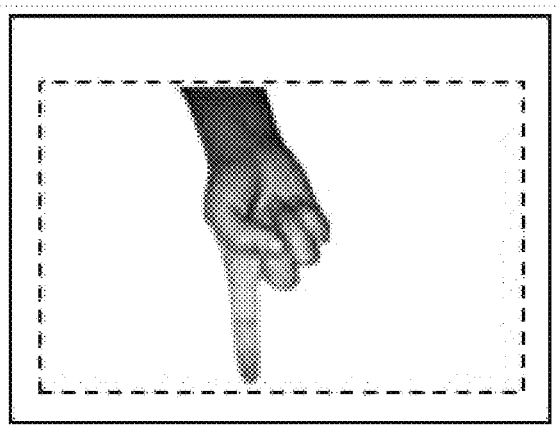
FIG. 6 is a directional diagram of downward gesture in a specific region of space.
Figure 7:
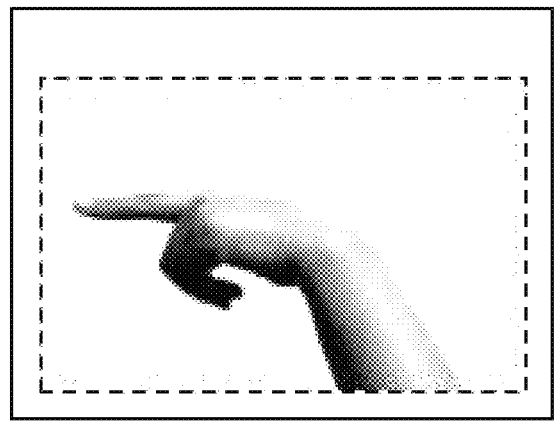
FIG. 7 is a directional diagram of leftward gesture in a specific region of space.
Figure 8:
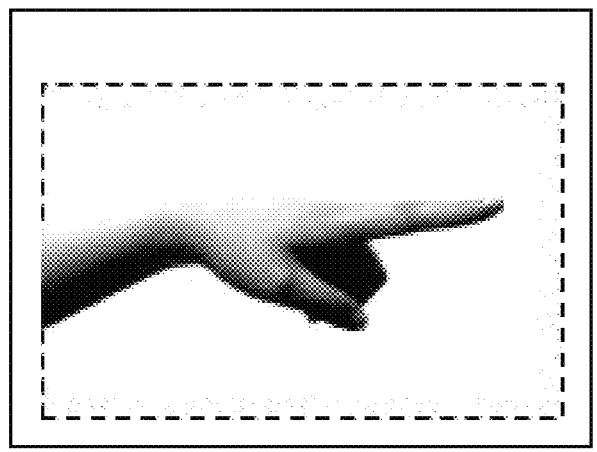
FIG. 8 is a directional diagram of rightward gesture in a specific region of space.
Figure 9:
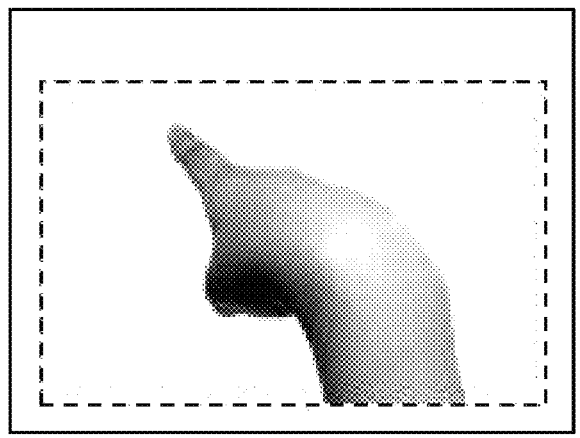
FIG. 9 is a directional diagram of forward gesture in a specific region of space.
Figure 10:
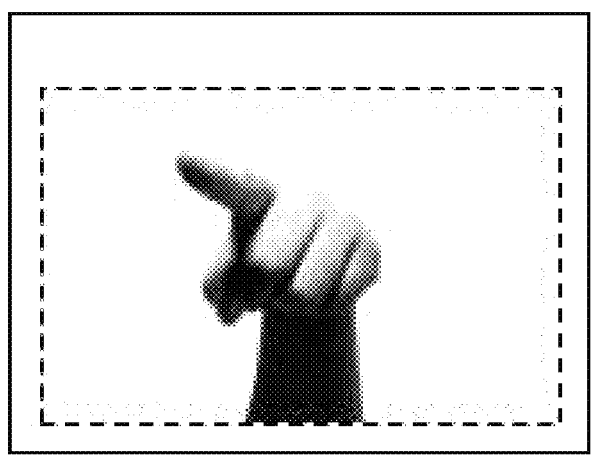
FIG. 10 is a directional diagram of backward gesture in a specific region of space.

The region within the block in dotted line in FIG. 4 refers to a specific region of space. As shown in FIG. 5-10, directions of a gesture in a specific region of space may comprise six directions, i.e., upward, downward, leftward, rightward, forward and backward. And the six upward, downward, leftward, rightward, forward and backward directions correspond to six different operations respectively. For example, an upward gesture as shown in FIG. 5 corresponds to the operation of scrolling upward the display interface of the electronic device, a downward gesture as shown in FIG. 6 corresponds to the operation of scrolling downward the display interface of the electronic device, a leftward gesture as shown in FIG. 7 corresponds to the operation of scrolling leftward the display interface of the electronic device, a rightward gesture as shown in FIG. 8 corresponds to the operation of scrolling rightward the display interface of the electronic device, a forward gesture as shown in FIG. 9 corresponds to the operation of zooming out or enlarging the display interface of the electronic device, and a backward gesture as shown in FIG. 10 corresponds to the operation of zooming in or reducing the display interface of the electronic device.

In this embodiment, the step of executing the operation corresponding to the gesture described in S305 may be: keeping executing the operation corresponding to the direction of the gesture. While the step of keeping executing the operation corresponding to the direction of the gesture may include:

keeping executing the operation corresponding to the direction of the gesture until the gesture acquired in a specific region of space by an image acquisition unit changes, which means, keeping executing the operation corresponding to the gesture provided that the gesture in a specific region of space does not change, and stop executing the operation corresponding to the gesture in the case where the gesture changes or other triggering condition occurs. For example, in the case where the direction of the gesture is upward, then S305 may be keeping scrolling upward the display interface of the electronic device until the gesture changes, where, the gesture changes could specifically be the direction of the gesture changes, or the gesture has a relative displacement, etc.

In the prior art, as the corresponding operation is executed by way of dragging, repeated operation would be necessary in case of any big change to the current display interface, which is very redundant. By keeping executing the operation of dragging the interface to the direction corresponding to the gesture in S305, it achieves that just remaining the current gesture would be enough even when it is necessary to keep executing corresponding operations, which avoids repeated operation and greatly simplifies the operation.

In the present disclosure, the execution of corresponding operation can also be accelerated by several gestures with the same direction, which is described according to an embodiment as follows:

The Third Embodiment

Figure 11:
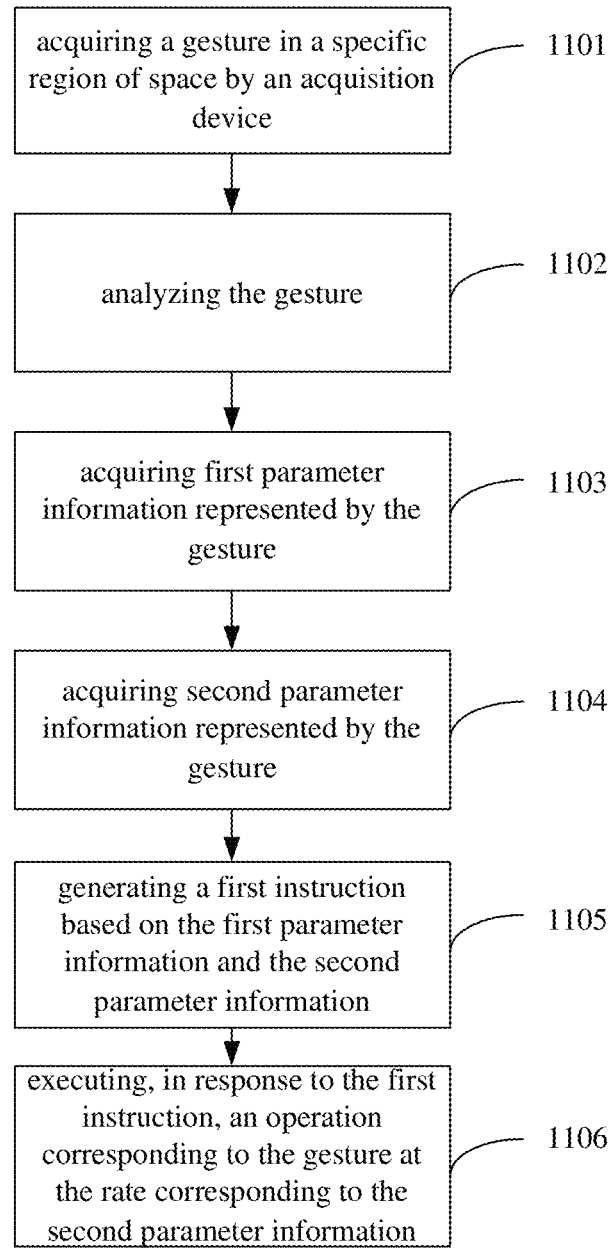
FIG. 11 is a schematic flow chart of a processing method according to an embodiment of the present disclosure.

FIG. 11 illustrates a processing method according to another embodiment provided in the present disclosure. In this embodiment, the method may be applied to an electronic device, and the electronic device includes an image acquisition unit, the method includes steps 1101 to 1106.

S1101: acquiring a gesture in a specific region of space by the image acquisition unit; where, the gesture is directional, and the specific region of space refers to a video region where video signals can be acquired by the image acquisition unit.

S1102: analyzing the gesture.

S1103: acquiring first parameter information represented by the gesture, where, the first parameter information is used to indicate the direction of the gesture.

S1104: acquiring second parameter information represented by the gesture, where, the second parameter information is used to indicate the number of gestures with the same first parameter information.

S1105: generating a first instruction based on the first parameter information and the second parameter information, where, the first instruction may be an instruction corresponding to the same or the opposite direction of the gesture indicated by the first parameter information.

S1106: executing, in response to the first instruction, an operation corresponding to the gesture at the rate corresponding to the second parameter information.

Where, the electronic device may be a device which includes an image acquisition unit, such as TV sets or intelligent glasses, and the image acquisition unit is ale to acquire video signals, such as cameras.

Figure 12:
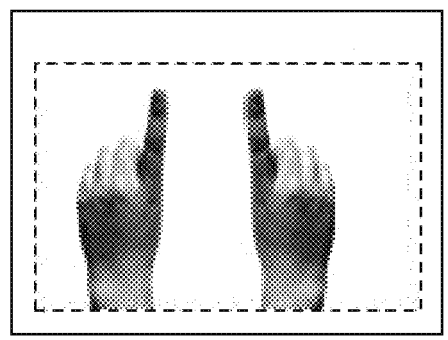
FIG. 12 is a schematic diagram for two upward gestures in a specific region of space.
Figure 13:
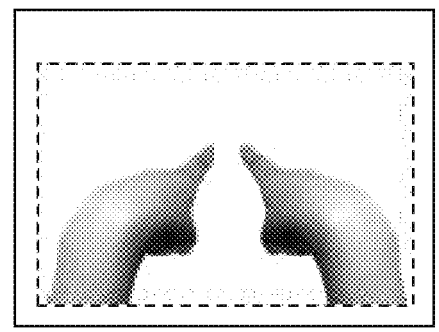
FIG. 13 is a schematic diagram for two forward gestures in a specific region of space.

In this embodiment, the second parameter indicates the number of gestures with the same first parameter information, while in S1106 the operation corresponding to the gesture is executed at the speed corresponding to the second parameter information. It can be seen in this embodiment that, operation corresponding to the gesture is executed faster or slower according to the number of gestures with the same first parameter information, i.e., the number of gestures with the same direction. For example, in S1101 when a gesture or gestures acquired in a specific region of space are the gestures indicated in FIG. 12, i.e., two upward gestures, then, the display interface of the electronic device can be scrolled upward at two times of or half of the speed. Take another example for illustration, in the case where a gesture or gestures acquired in a specific region of space are the gestures indicated in FIG. 13, i.e., two forward gestures, then, the display interface of the electronic device can be zoomed out or enlarged at two times of or half of the speed.

Here, some specific gestures can be pre-stored. And only when the acquired gesture matches with the pre-stored gesture can the corresponding operation be executed, which may therefore avoid any wrong operation.

The Fourth Embodiment

Figure 14:
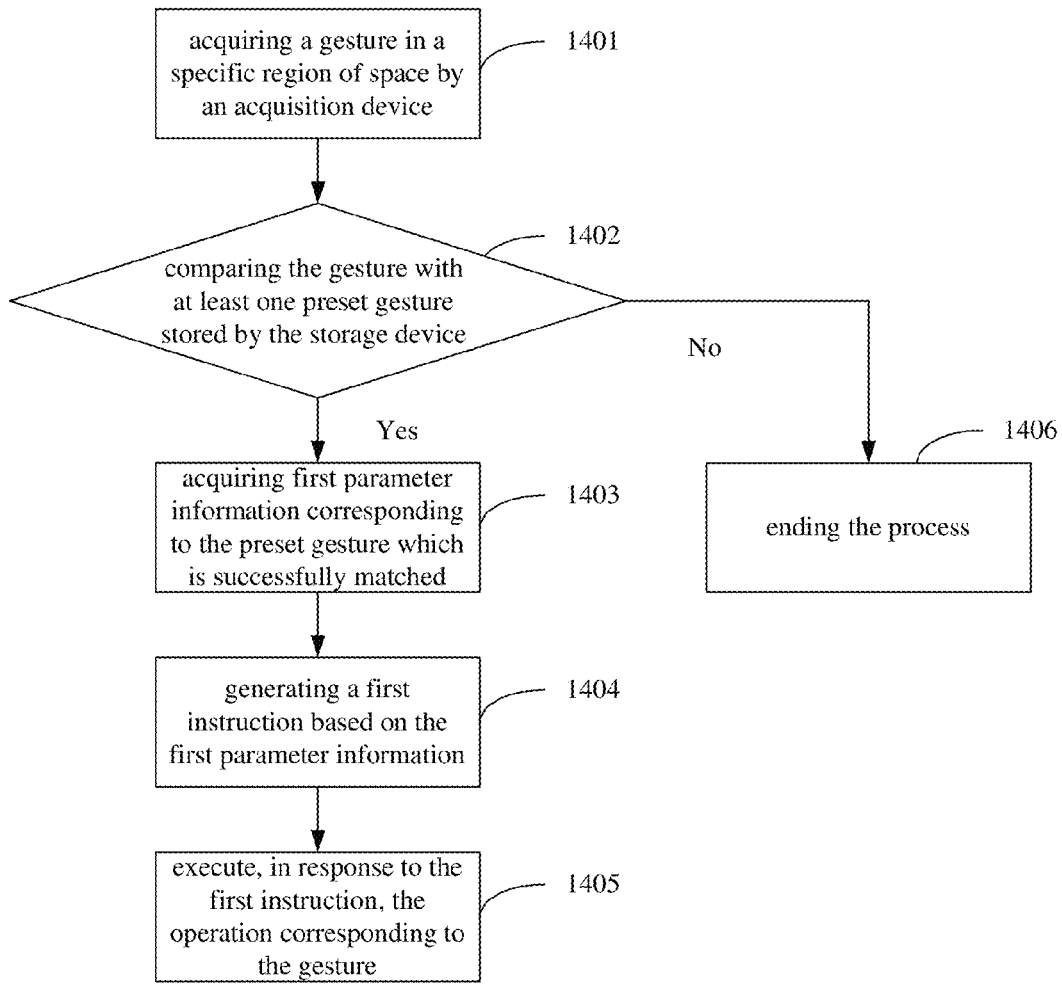
FIG. 14 is a schematic flow chart of a processing method according to an embodiment of the present disclosure.

FIG. 14 illustrates a processing method according to another embodiment provided in the present disclosure. In this embodiment, the method may be applied to an electronic device, and the electronic device includes an image acquisition unit and a storage unit. The storage unit stores at least one preset gesture and each preset gesture includes corresponding first parameter information. The method including steps 1401 to 1406.

S1401: acquiring a gesture in a specific region of space by the image acquisition unit, where, the gesture is directional, and the specific region of space refers to a video region where video signals can be acquired by the image acquisition unit.

S1402: comparing the gesture with the at least one preset gesture stored in the storage unit; if the gesture matches with the preset gesture stored in the storage unit, executing S1403, and the gesture now acquired in S1401 is one of the preset gestures stored by the storage unit; if the gesture does not match with the preset gesture stored in the storage unit, executing S1406, and the gesture now acquired in S1401 is not the preset gesture stored by the storage unit.

S1403: acquiring first parameter information corresponding to the preset gesture which is matched with the gesture acquired in S1401, where, the first parameter information is used to indicate the direction of the gesture.

S1404: generating a first instruction based on the first parameter information, where, the first instruction may be an instruction corresponding to the same or the opposite direction of the gesture indicated by the first parameter information.

S1405: executing, in response to the first instruction, the operation corresponding to the gesture. Ending the process.

S1406: Ending the process. Now it may also be: reminding the user of the failure in matching and showing the correct preset gesture; or, returning to S1401 to re-acquire a gesture in a specific region of space.

Where, the electronic device may be a device which includes an image acquisition unit, such as TV sets or intelligent glasses, and the image acquisition unit is able to acquire video signals, such as cameras.

It can be seen in this embodiment that only in the case where the gesture acquired in S1401 is successfully matched with preset gestures stored in a storage unit can S1403-1405 be executed, i.e., achieving the execution of the operation corresponding to the gesture.

Under certain conditions, a direction of a gesture may not be exactly upward, downward, leftward, rightward, forward or backward. Provided that the direction of the gesture is within a certain direction interval, the operation corresponding to the gesture can thereby be executed. Detailed description is given as follows:

The Fifth Embodiment

Figure 15:
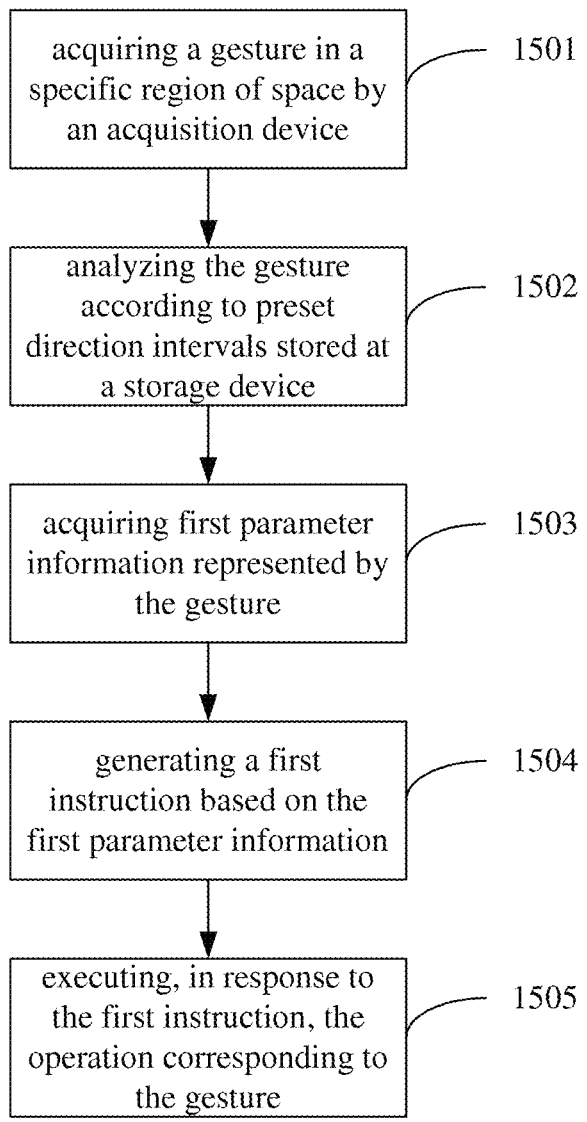
FIG. 15 is a schematic flow chart of a processing method according to an embodiment of the present disclosure.

FIG. 15 illustrates a processing method according to another embodiment provided in the present disclosure. In this embodiment, the method may be applied to an electronic device, the electronic device includes an image acquisition unit and a storage unit, and the storage unit stores preset direction intervals, the method includes step 1501 to 1505.

S1501: acquiring a gesture in a specific region of space by the image acquisition unit; where, the gesture is directional and the specific region of space refers to the video region where video signals can be acquired by the image acquisition unit.

S1502: analyzing the gesture according to the preset direction intervals stored by the storage unit. Here, provided that the direction of the gesture acquired in S1501 is successfully matched with certain preset direction interval, then the direction corresponding to the successfully matched direction interval shall be taken as the direction of the gesture. For example, six preset direction intervals are stored by the storage unit, and the six preset direction intervals are intervals of 45 degrees from the upward, downward, leftward, rightward, forward and backward directions. If the direction of the gesture acquired in S1501 is 10 degrees from the upward direction, then it belongs to the preset upward direction interval, and the analyzed direction is an upward direction.

S1503: acquiring first parameter information represented by the gesture, where, the first parameter information is used to indicate the direction of the gesture.

S1504: generating a first instruction based on the first parameter information, where, the first instruction may be an instruction corresponding to the same or the opposite direction of the gesture indicated by the first parameter information.

S1505: executing, in response to the first instruction, the operation corresponding to the gesture.

It can be seen in this embodiment that, by storing preset direction intervals in a storage unit, when a user wants to execute an operation corresponding to a gesture, he only needs to point to a correct direction in the preset direction interval, which therefore simplifies a user's operation.

In the present disclosure, first parameter information of a gesture may be acquired by obtaining boundary information of the gesture and acquiring the first parameter information according to the boundary information, which specifically may be an arising direction of boundary information of a gesture, or an extreme value of the curvature. Description of the situation to acquire first parameter information by an arising direction of boundary information of a gesture is given in an embodiment as follows.

The Sixth Embodiment

Figure 16:
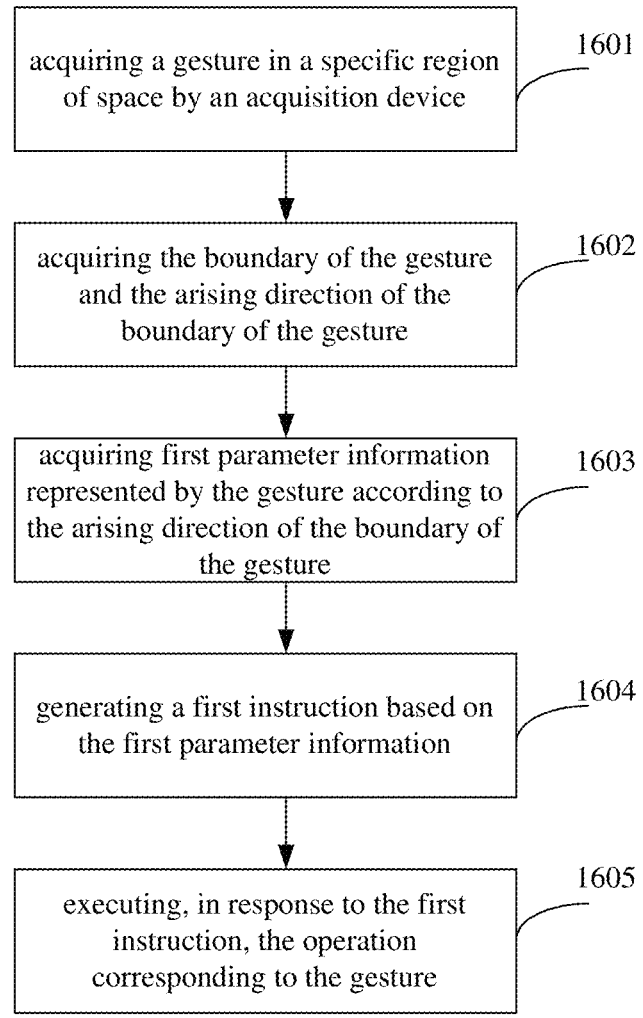
FIG. 16 is a schematic flow chart of a processing method according to an embodiment of the present disclosure.

FIG. 16 illustrates a processing method according to another embodiment provided in the present disclosure. In this embodiment, the method may be applied to an electronic device, the electronic device includes an image acquisition unit and a storage unit, and the storage unit stores preset direction intervals, the method includes step 1601 to 1605.

S1601: acquiring a gesture in a specific region of space by the image acquisition unit; wherein, the gesture is directional, and the specific region of space refers to the video region where video signals can be acquired by the image acquisition unit.

S1602: acquiring the boundary of the gesture and the arising direction of the boundary of the gesture.

S1603: acquiring first parameter information represented by the gesture according to the arising direction of the boundary of the gesture, where, the first parameter information is used to indicate the direction of the gesture.

S1604: generating a first instruction based on the first parameter information, where, the first instruction may be an instruction corresponding to the same or the opposite direction of the gesture indicated by the first parameter information.

S1605: executing, in response to the first instruction, the operation corresponding to the gesture.

Wherein, the electronic device may be a device which includes an image acquisition unit, such as TV sets or intelligent glasses, and the image acquisition unit is able to acquire video signals, such as cameras.

It can be known from the above technical solutions that, in the present disclosure, a directional gesture is acquired in a specific region of space by an acquisition device; first parameter information is acquired where a direction is indicated by the gesture; and an operation corresponding to the gesture is executed in response to a first instruction generated by the first parameter information. It can be seen in the present disclosure that, in executing an operation corresponding to the gesture, only the directional gesture in a specific region of space can trigger corresponding operation, and therefore a wrong operation may not be easily incurred.

The technical solution of the present disclosure may be applied to controlling the camera of an electronic device. In the prior art, when a picture is to be taken, for example, to be shot by a camera, manual adjustment may be necessary in case of focusing. For example, the existing material digital camera supports an auto mode of focusing, which can be achieved by a direct click of the object on the touch screen of the camera, and thus requires an operation by the user on the touch screen. As what the user looks at during the operation is the touch screen instead of the real view, it may possibly lead to a deviation of operation and therefore affect the shooting quality. In case of intelligent glasses, a picture is usually taken directly after the view is found without any preceding focusing procedure. While focusing procedure before taking a picture helps more for a user to handle a picture, represent the scene before him and enable him to adjust the focusing point to the target that he is interested in. Without the focusing procedure, the shooting quality may be affected, and the shooting may not be focused on the object that the user favors, and therefore user experience may be affected.

The Seventh Embodiment

The processing method provided in the embodiments of the present disclosure may be applied to an electronic device which includes an image acquisition unit. The method includes: acquiring a first image which contains an instruction object by the image acquisition unit; analyzing the first image and obtaining a first direction corresponding to the instruction object; determining a first target corresponding to the first direction in the image acquisition area of the image acquisition unit; and adjusting the focusing point of the image acquisition unit to the first target.

In the case where there is such an instruction object in the image acquisition area of the image acquisition unit, the first target in the image acquisition area may be determined according to the direction where the instruction object points, and that the focusing point may be determined to be adjusted to the first target. In this way, focusing point may be adjusted by instruction information such as a gesture, which not only solves the technical problem of incapability of focusing that existed in the prior art, but also provides such a simple way of implementation. All those complex operations no longer need to be remembered. The focusing point may be adjusted to the target simply by pointing by a hand or any other instructing object at the target to be shot. As what the user looks at in shooting is the view in stead of the screen, the adjustment of the focusing point becomes more precise. Utilization of technical solutions provided in the present disclosure not only improves the shooting quality due to the capability of focusing adjustment, but also enhances the shooting efficiency for the user to obtain his favorable image as soon as possible, which therefore improves the user experience.

Figure 17:
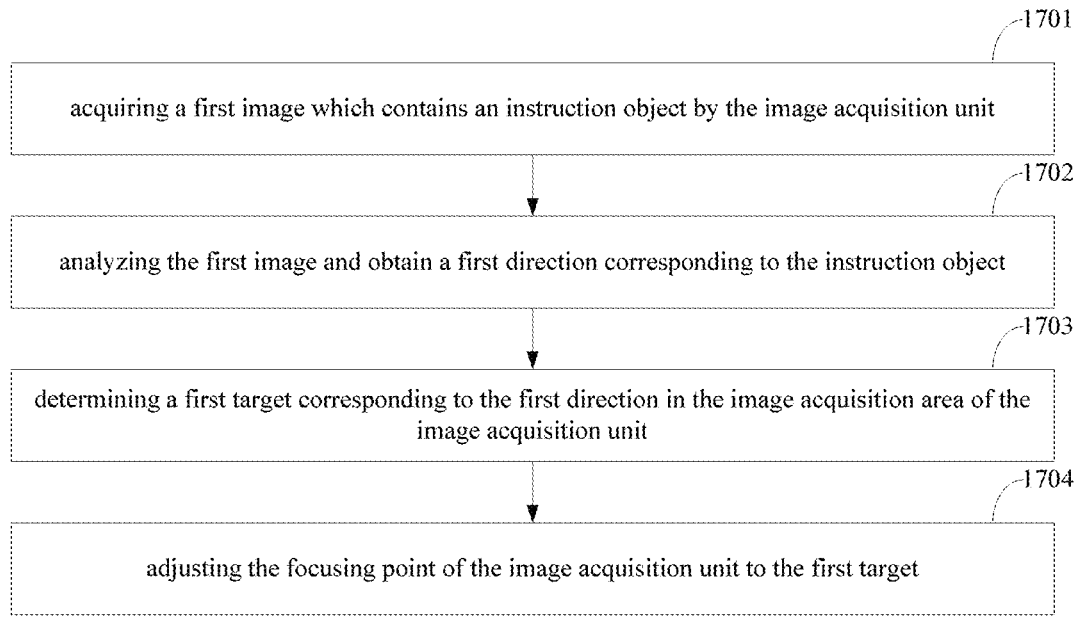
FIG. 17 is a structural diagram of an electronic device according to an embodiment of the present disclosure.

Referring to FIG. 17, a method for adjusting the focusing point provided in the embodiments of the present disclosure may be applied to an electronic device which includes an image acquisition unit, and the method includes Steps 1701 to 1703.

Step 1701: acquiring a first image which contains an instruction object by the image acquisition unit.

The first image which contains the instruction object may firstly be acquired by the image acquisition unit of the electronic device.

Specifically, any object that is capable of indicating a direction may be taken as the instruction object described in the embodiments of the present disclosure. For example, the instruction object may be a hand of a user, the hand may have a gesture, the gesture may have a corresponding first end, and the first end may point to a direction.

In the embodiments of the present disclosure, the first image which contains an object may firstly be acquired by the image acquisition unit, through recognizing the first image, the object contained in the first image may be determined as the instruction object.

For example, the first image which contains a hand may be acquired by the image acquisition unit, through recognizing the first image, the hand may be determined to have a gesture, which for example is a gesture of stretching out a finger, then the gesture has a corresponding first end, which is the tip of the finger stretched out, the first end of the gesture points to a direction, then the hand contained in the first image may be determined as the instruction object.

Step 1702: analyzing the first image and acquiring a first direction corresponding the instruction object.

In the embodiments of the present disclosure an analysis may be made to the first image obtained to obtain the first direction corresponding to the instruction object.

Specifically, if the instruction object contained in the first image is a hand of a user, gesture information of the hand may be acquired. The direction where the line extending from the middle of the two eyes of the user to the first end of the gesture corresponding to the gesture information points may be determined as the first direction.

For example, if the instruction object contained in the first image is a hand of a user, and that the hand has a gesture, which for example is a gesture of stretching out a finger, then the tip of the finger stretched out is the first end. And the direction where the line extending from the middle of the two eyes of the user who is operating the electronic device to the tip of the finger points may be determined as the first direction.

Step 1703: determining a first object corresponding to the first direction in an image acquisition area of the image acquisition unit.

In the embodiments of the present disclosure, after the first direction is determined, an extended line may be made to the line extending from the middle of the two eyes of the user to the first end of the gesture corresponding to the gesture information, and the direction where the extended line points is the first direction. In the image acquisition area of the image acquisition unit, the extended line intersects with a shooting target, and the shooting target that intersects with the extended line may be determined as the first target.

For example, the first image which contains a hand may firstly be acquired by the image acquisition unit, through recognizing the first image, the hand may be determined to have a gesture, which for example is a gesture of stretching out a finger, then the gesture has a corresponding first end, the tip of the finger stretched out is the first end, and the direction where the line extending from the middle of the two eyes of the user who is operating the electronic device to the tip of the finger points may be determined as the first direction.

The extended line may be made to the line extending from the middle of the two eyes of the user who is operating the electronic device to the tip of the finger. The direction where the extended line points is the first direction. In the image acquisition area of the image acquisition unit, the extended line intersects with a shooting target, which for example is a water cup, and the water cup may be determined as the first target.

In the embodiments of the present disclosure, after an extended line is made to the line extending from the middle of the two eyes of the user who is operating the electronic device to the tip of the finger, in the image acquisition area of the image acquisition unit, due to the depth-of-field existed in shooting, there might be more than one shooting targets that intersect with the extended line. For example, in the image acquisition area of the image acquisition unit, there might be a chair at a nearer place and a desk at a further place, both of which are at the same extended line.

In the embodiments of the present disclosure, nearer or further is defined relative to the electronic device, where a nearer place refers to the position that is relatively close to the electronic device, and a further place refers to the position that is relatively far away from the electronic device.

After the extended line is made, in the image acquisition area of the image acquisition unit, the extended line may intersect with both the chair and the desk. In the embodiments of the present disclosure, if there are more than one shooting targets that intersect with the extended line, then one of them may be chosen as the first target.

For example, one way is that any shooting target may be chosen as the first target, or the other way is that among several shooting targets, the shooting target that is closest to the electronic device may be chosen as the first target.

Specifically, before the first target corresponding to the first direction is determined in the image acquisition area of the image acquisition unit, an extended line may firstly be determined to the line extending from the middle of the two eyes of a person to the first end of the gesture corresponding to the gesture information. After the extended line is determined, the number of the shooting targets that intersect with the extended line in the image acquisition area of the image acquisition unit may be determined. If the number of the shooting targets that intersect with the extended line in the image acquisition area is determined as 1, then the shooting target may be determined as the first target. And if the number of the shooting targets that intersect with the extended line in the image acquisition area is determined as more than 1, than one of them may be chosen as the first target.

Alternatively, one way could be to choose any shooting target as the first target.

Alternatively, the other way could be to choose among several shooting targets the shooting target that is closest to the electronic device as the first target.

In the embodiments of the present disclosure, several times may be taken to determine the first target. And firstly take the example of determining only one shooting target each time according to the first direction for illustration.

Specifically, the first image which contains a hand may firstly be acquired by the image acquisition unit, through recognizing the first image, the hand may be determined to have a gesture, which for example is a gesture of stretching out a finger, then the gesture has a corresponding first end, the tip of the finger stretched out is the first end, and the direction where the line extending from the middle of the two eyes of the user who is operating the electronic device to the tip of the finger points may be determined as the first direction.

The extended line may be made to the line extending from the middle of the two eyes of the user who is operating the electronic device to the tip of the finger. The direction where the extended line points is the first direction. In the image acquisition area of the image acquisition unit, the extended line intersects with a shooting target, and the shooting target may be determined as the first target.

For example, a hand of a user remains at the first position for a first period of time, then the electronic device may determine the first object for several times within the first period of time. And each time a shooting target may be determined according to the first direction. For example, it determines for N times within the first period of time, and N is more than 1, then N shooting targets may be determined and one of N shooting objects may be chosen as the first target.

Alternatively, one way could be to choose any shooting target from N shooting targets as the first target.

Alternatively, one way could be to determine from N shooting targets the shooting target that most frequently occurs, i.e., to determine from N shooting targets the shooting target which is most frequently determined, and take the shooting target that most frequently occurs as the first target.

For example, the electronic device determines four times in all, and four shooting targets are determined. The one firstly determined is the first shooting target, the one secondly determined is the second shooting target, the one thirdly determined is the first shooting target, and the one fourthly determined is a third shooting target. When one of N shooting targets is to be chosen as the first target, any one of the first shooting target, the second shooting target and the third shooting target may be chosen as the first target. Or, in the case where one of N shooting targets is to be chosen as the first target, among N shooting targets, the shooting target that most frequently occurs may be determined. In this embodiment, the first shooting target may be determined as the shooting target that most frequently occurs, and the first shooting target may be determined as the first target.

In the embodiments of the present disclosure, within the first period of time, the first image may be acquired for N times by the electronic device. Each time the first image is acquired, an analysis may be made to the first image, and the first direction corresponding to the instruction object contained in the first image may be acquired, then the shooting target corresponding to the first direction may be determined in the image acquisition area of the image acquisition unit, i.e., at least N shooting targets may be determined by acquiring the first image for N times, and one shooting target may be chosen from the at least N shooting targets as the first target.

By way of determining for several times a shooting target and determining among several shooting targets the first target, a wrong instruction incurred by an unsteady hand of a user may be avoided, hence a wrong operation may be avoided, which to the greatest extent guarantees that the focusing point may be adjusted to the target that a user favors, and thus improves the precision of shooting.

Specifically, the first image which contains a hand may firstly be acquired by the image acquisition unit, through recognizing the first image, the hand may be determined to have a gesture, which for example is a gesture of stretching out a finger, then the gesture has a corresponding first end, the tip of the finger stretched out is the first end, and the direction where the line extending from the middle of the two eyes of the user who is operating the electronic device to the tip of the finger points may be determined as the first direction.

The extended line may be made to the line extending from the middle of the two eyes of the user who is operating the electronic device to the tip of the finger. The direction where the extended line points is the first direction. In the image acquisition area of the image acquisition unit, the extended line intersects with a shooting target, and the shooting target may be determined as the first target. In the embodiment, the extended line may intersect with at least two shooting targets at the same time.

For example, a hand of a user remains at a first position for a first period of time, then the electronic device may determine the first target for several times within the first period of time. Each time a shooting target may be determined according to the first direction. For example, it determines for N times within the first period of time, and N is more than 1, then at least N shooting targets may be determined, and one of the at least N shooting targets may be chosen as the first target.

In the embodiments of the present disclosure, for example, the electronic device determines the first target for three times in all, for the first time, the first shooting target is determined, for the second time, the second shooting target and the third shooting target are determined, and for the third time, the fourth shooting target is determined, then one of the first shooting target, the second shooting target, the third shooting target and the fourth shooting target may be directly chosen as the first target.

Or, in the embodiments of the present disclosure, for example, the electronic device determines the first target for three times in all, for the first time, the first shooting target is determined, for the second time, the second shooting target and a third shooting target are determined, and for the third time, the fourth shooting target is determined, after a second shooting target and a third shooting target are determined for the second time, one of the second shooting target and the third shooting target may be chosen as the fifth shooting target. For example, one way could be to choose any shooting target from the second shooting target and the third shooting target as the first target, or the other way could be to choose the shooting target that is closest to the electronic device from the second shooting target and the third shooting target. For example, if a first distance in between the second shooting target and the electronic device is less than a second distance in between the third shooting target and the electronic device, then the second shooting target may be determined as the fifth shooting target. After that, one of the first shooting target, the fourth shooting target, and the fifth shooting target may be chosen as the first target.

Alternatively, one way to choose one of at least N shooting targets as the first target could be to choose any one of at least N shooting targets as the first target.

Alternatively, one way to choose one of at least N shooting targets as the first target could be to determine from at least N shooting targets the shooting target that most frequently occurs, i.e., to determine from at least N shooting targets the shooting target which is most frequently determined, and take the shooting target that most frequently occurs as the first target.

Step 1704: adjusting a focusing point of the image acquisition unit to the first target.

In the embodiments of the present disclosure, after the first target is determined, the focusing point of the image acquisition unit may be adjusted to the first target.

In the embodiments of the present disclosure, after the focusing point of the image acquisition unit is adjusted to the first target, a preview of the shooting may be performed for the image acquisition area of the image acquisition unit or a picture may be taken. Adjustment of the focusing point before the shooting allows a more precise focusing point, and as the focusing point is chosen by a user himself, it shall meet the user's demand even better.

Description of the method for adjusting focusing point incorporated with several detailed embodiments is provided below. And several possible application scenes for the method are provided in the following embodiments. It should be specified that the following is only detailed embodiments of the disclosure for interpretation of the present disclosure and shall not be construed as a restriction to the present disclosure. Any embodiment with the same spirit of the present disclosure shall be deemed within the scope of protection of the present disclosure. Those with ordinary skill in the art shall be able to make any alternatives according to the spirit of the present disclosure.

The Eighth Embodiment

The first image which contains the instruction object may firstly be acquired by the image acquisition unit of the electronic device.

The first image which contains a hand may be acquired by the image acquisition unit, through recognizing the first image, the hand may be determined to have a gesture, which for example is a gesture of stretching out a finger, and the gesture has a corresponding first end, which is the tip of the finger stretched out, the first end of the gesture points to a direction, then the hand contained in the first image may be determined as the instruction object.

In this embodiment, the instruction object contained in the first image is a hand of a user, the gesture information of the hand may be acquired. After the gesture information is acquired, the direction where the line extending from the middle of the two eyes of the user to the first end of the gesture corresponding to the gesture information points may be determined as the first direction, and the direction where the line extending from the middle of the two eyes of the user who is operating the electronic device to the tip of the finger points may be determined as the first direction.

In this embodiment, after the first direction is determined, an extended line may be made to the line extending from the middle of the two eyes of a user to the first end of the gesture corresponding to the gesture information, the direction where the extended line points is the first direction. In the image acquisition area of the image acquisition unit, the extended line intersects with a shooting target, and the shooting target that intersects with the extended line may be determined as the first target.

For example, in this embodiment, an extended line may be made to the line extending from the middle of the two eyes of the user who is operating the electronic device to the tip of the finger, and the direction where the extended line points is the first direction. In the image acquisition area of the image acquisition unit, the extended line intersects with a shooting target, which for example is a water cup, and the water cup can be determined as the first target.

In this embodiment, after the first target is determined, the focusing point of the image acquisition unit may be adjusted to the first target.

In this embodiment, after the focusing point of the image acquisition unit is adjusted to the first target, a preview of the shooting may be performed for the image acquisition area of the image acquisition unit or a picture may be taken. Adjustment of the focusing point before the shooting allows a more precise focusing point, and as the focusing point is chosen by a user himself, it shall meet the user's demand even better.

The Ninth Embodiment

The first image which contains the instruction object may firstly be acquired by the image acquisition unit of the electronic device.

The first image which contains a hand may be acquired by the image acquisition unit, through recognizing the first image, the hand may be determined to have a gesture, which for example is a gesture of stretching out a finger, and the gesture has a corresponding first end, which is the tip of the finger stretched out, the first end of the gesture points to a direction, then the hand contained in the first image may be determined as the instruction object.

In this embodiment, the instruction object contained in the first image is a hand of a user, the gesture information of the hand may be acquired. After the gesture information is acquired, the direction where the line extending from the middle of the two eyes of the user to the first end of the gesture corresponding to the gesture information points may be determined as the first direction, and the direction where the line extending from the middle of the two eyes of the user who is operating the electronic device to the tip of the finger points may be determined as the first direction.

In this embodiment, after the first direction is determined, an extended line may be made to the line extending from the middle of the two eyes of the user to the first end of the gesture corresponding to the gesture information, the direction where the extended line points is the first direction. In the image acquisition area of the image acquisition unit, the extended line intersects with a shooting target.

In this embodiment, due to the depth-of-field existed in shooting, after an extended line is made to the line extending from the middle of the two eyes of the user who is operating the electronic device to the tip of the finger, in the image acquisition area of the image acquisition unit, there might be more than one shooting targets that intersect with the extended line. For example, in the image acquisition area of the image acquisition unit, there might be a chair at a nearer place and a desk at a further place, both of which are at the same extended line.

In this embodiment, nearer or further is defined relative to the electronic device, where a nearer place refers to the position that is relatively close to the electronic device, and a further place refers to the position that is relatively far away from the electronic device.

After the extended line is made, in the image acquisition area of the image acquisition unit, the extended line may intersect with both the chair and the desk. In this embodiment, if there are more than one shooting targets in the image acquisition area of the image acquisition unit that intersect with the extended line, then one of them may be chosen as the first target.

For example, one way is that any shooting target may be chosen as the first target, or the other way is that among several shooting targets, the shooting target that is closest to the electronic device may be chosen as the first target.

In this embodiment, among several shooting targets, the shooting target that is closest to the electronic device is chosen as the first target.

The first distance in between the chair and the electronic device and the second distance in between the desk and the electronic device may be respectively determined. Through comparison between the first distance and the second distance, the chair may be determined as the shooting target that is closest to the electronic device, and the chair may be determined as the first target.

In this embodiment, after the first target is determined, the focusing point of the image acquisition unit may be adjusted to the first target.

In this embodiment, after the focusing point of the image acquisition unit is adjusted to the first target, a preview of the shooting may be performed for the image acquisition area of the image acquisition unit or a picture may be taken. Adjustment of the focusing point before the shooting allows a more precise focusing point, and as the focusing point is chosen by a user himself, it shall meet the user's demand even better.

The Tenth Embodiment

The first image which contains the instruction object may firstly be acquired by the image acquisition unit of the electronic device.

The first image which contains a hand may be acquired by the image acquisition unit, through recognizing the first image, the hand may be determined to have a gesture, which for example is a gesture of stretching out a finger, and the gesture has a corresponding first end, which is the tip of the finger stretched out, the first end of the gesture points to a direction, then the hand contained in the first image may be determined as the instruction object.

In this embodiment, the instruction object contained in the first image is a hand of a user, the gesture information of the hand may be acquired. After the gesture information is acquired, the direction where the line extending from the middle of the two eyes of the user to the first end of the gesture corresponding to the gesture information points may be determined as the first direction, and the direction where the line extending from the middle of the two eyes of the user who is operating the electronic device to the tip of the finger points may be determined as the first direction.

In this embodiment, after the first direction is determined, an extended line may be made to the line extending from the middle of the two eyes of the user to the first end of the gesture corresponding to the gesture information, the direction where the extended line points is the first direction. In the image acquisition area of the image acquisition unit, the extended line intersects with a shooting target.

In this embodiment, several times may be taken to determine the first target. For example, in this embodiment, only one shooting target may be determined each time according to the first direction.

In this embodiment, within the first period of time, the first image may be acquired for N times by the electronic device. Each time the first image is acquired, an analysis may be made to the first image, and the first direction corresponding to the instruction object contained in the first image may be acquired, then the shooting target corresponding to the first direction may be determined in the image acquisition area of the image acquisition unit, i.e., at least N shooting targets may be determined by acquiring the first image for N times, and one shooting target may be chosen from the at least N shooting targets as the first target.

For example, four shooting targets are determined by the electronic device. The one firstly determined is the first shooting target, the one secondly determined is the second shooting target, the one thirdly determined is the first shooting target, and the one fourthly determined is the third shooting target. In the case where one of N shooting targets is to be chosen as the first target, any one of the first shooting target, the second shooting target and the third shooting target may be chosen as the first target. Or, in the case where one of N shooting targets is to be chosen as the first target, the shooting target that most frequently occurs may be determined from N shooting targets. In the embodiment, the shooting target that most frequently occurs may be determined as the first shooting target, and the first shooting target may be determined as the first target.

In this embodiment, the shooting target that determined as most frequently occurs may be chosen from N shooting targets as the first target, and the first shooting target may be determined as the first target.

In this embodiment, after the first target is determined, the focusing point of the image acquisition unit may be adjusted to the first target.

In this embodiment, after the focusing point of the image acquisition unit is adjusted to the first target, a preview of the shooting may be performed for the image acquisition area of the image acquisition unit or a picture may be taken. Adjustment of the focusing point before the shooting allows a more precise focusing point, and as the focusing point is chosen by a user himself, it shall meet the user's demand even better.

The Eleventh Embodiment

The first image which contains the instruction object may firstly be acquired by the image acquisition unit of the electronic device.

The first image which contains a hand may be acquired by the image acquisition unit, through recognizing the first image, the hand may be determined to have a gesture, which for example is a gesture of stretching out a finger, and the gesture has a corresponding first end, which is the tip of the finger stretched out, the first end of the gesture points to a direction, then the hand contained in the first image may be determined as the instruction object.

In this embodiment, the instruction object contained in the first image is a hand of a user, the gesture information of the hand may be acquired. After the gesture information is acquired, the direction where the line extending from the middle of the two eyes of the user to the first end of the gesture corresponding to the gesture information points may be determined as the first direction, and the direction where the line extending from the middle of the two eyes of the user who is operating the electronic device to the tip of the finger points may be determined as the first direction.

In this embodiment, after the first direction is determined, an extended line may be made to the line extending from the middle of the two eyes of the user to the first end of the gesture corresponding to the gesture information, and the direction where the extended line points is the first direction. In the image acquisition area of the image acquisition unit, the extended line intersects with a shooting target.

In this embodiment, the first target may be determined for several times. For example, in this embodiment, several shooting targets may be determined during the determination of the shooting targets according to the first direction. And at least N shooting targets may be determined during N times of determination of the shooting targets according to the first direction.

In this embodiment, within the first period of time, the first image may be acquired for N times by the electronic device. Each time the first image is acquired, an analysis may be made to the first image, and the first direction corresponding to the instruction object contained in the first image may be acquired, then the shooting target corresponding to the first direction may be determined in the image acquisition area of the image acquisition unit, i.e., at least N shooting targets may be determined by acquiring the first image for N times, and one shooting target may be chosen from the at least N shooting targets as the first target.

By way of determining for several times the shooting targets and determining from the several shooting targets the first target, a wrong instruction incurred by an unsteady hand of a user may be avoided, hence a wrong operation may be avoided, which to the greatest extent guarantees that the focusing point may be adjusted to the target that a user favors, and thus improves the precision of shooting.

In this embodiment, an extended line may be made to the line extending from the middle of the two eyes of the user who is operating the electronic device to the tip of the finger. In the image acquisition area of the image acquisition unit, the extended line may intersect with at least two shooting targets at the same time.

In this embodiment, for example, the electronic device determines for three times, for the first time, the first shooting target is determined, for the second time, the second shooting target and the third shooting target are determined, and for the third time, the fourth shooting target is determined, then one of the first shooting target, the second shooting target, the third shooting target and the fourth shooting target may be directly chosen as the first target.

Or, In this embodiment, for example, the electronic device determines for three times, for the first time, the first shooting target is determined, for the second time, the second shooting target and the third shooting target are determined, and for the third time, the fourth shooting target is determined, after the second shooting target and the third shooting target are determined for the second time, one of the second shooting target and the third shooting target may be chosen as the fifth shooting target. For example, one way could be to choose any shooting target from the second shooting target and the third shooting target as the first target, or the other way could be to choose the shooting target that is closest to the electronic device from the second shooting target and the third shooting target. For example, if the first distance in between the second shooting target and the electronic device is less than the second distance in between the third shooting target and the electronic device, then the second shooting target may be determined as the fifth shooting target. After that, one of the first shooting target, the fourth shooting target, and the fifth shooting target may be chosen as the first target.

Alternatively, one way to choose one of at least N shooting targets as the first target could be to choose any one of at least N shooting targets as the first target.

Alternatively, one way to choose one of at least N shooting targets as the first target could be to determine from at least N shooting targets the shooting target that most frequently occurs, i.e., to determine from at least N shooting targets the shooting target which is most frequently determined, and take the shooting target that most frequently occurs as the first target.

In this embodiment, the shooting target which is most frequently determined is chosen from at least N shooting targets as the first target, and the shooting target which is most frequently determined may be determined as the first shooting target, and the first shooting target may be determined as the first target.

In this embodiment, after the first target is determined, the focusing point of the image acquisition unit may be adjusted to the first target.

In this embodiment, after the focusing point of the image acquisition unit is adjusted to the first target, a preview of the shooting may be performed for the image acquisition area of the image acquisition unit or a picture may be taken. Adjustment of the focusing point before the shooting allows a more precise focusing point, and as the focusing point is chosen by a user himself, it shall meet the user's demand even better.

The Twelfth Embodiment

Figure 18:
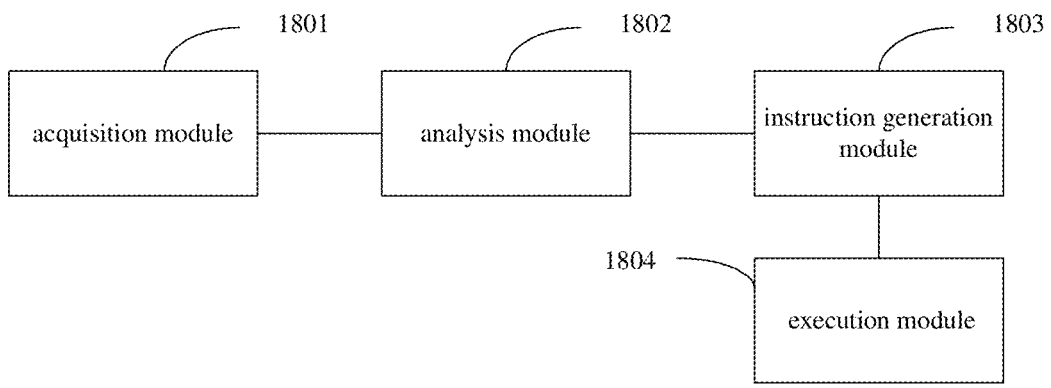
FIG. 18 is a structural diagram of an electronic device according to an embodiment of the present disclosure.

Referring to FIG. 18, an electronic device is further provided according to an embodiment of the present disclosure, the electronic device includes a image acquisition unit, and further includes:

an acquisition module 1801, configured to acquire a first image containing an instruction object, wherein the instruction object is directional;

an analysis module 1802, configured to analyze the first image, and obtain first parameter information represented by the instruction object, wherein the first parameter information indicates a direction of the instruction object;

an instruction generating module 1803, configured to generate a first instruction based on the first parameter information; and an execution module 1804, configured to execute, in response to the first instruction, an operation corresponding to the instruction object.

In the case where the technical solution is applied to controlling the display interface, the electronic device may have a structure as described in the following embodiments.

The Thirteenth Embodiment

Figure 19:
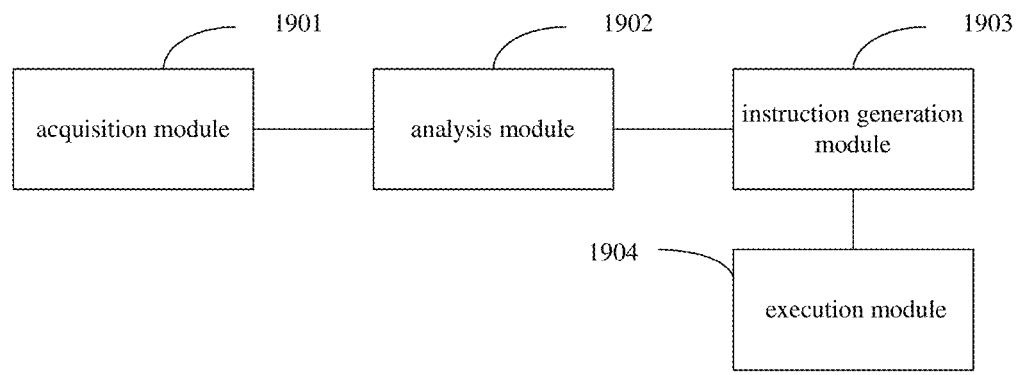
FIG. 19 is a structural diagram of an electronic device according to an embodiment of the present disclosure.

Referring to FIG. 19, an electronic device is further provided according to an embodiment of the present disclosure, where, the electronic device includes: an acquisition module 1901, an analysis module 1902, an instruction generation module 1903 and an execution module 1904.

The acquisition device 1901 is configured to acquire a gesture in a specific region of space; where, the gesture is directional, and the specific region of space refers to the video region where video signals can be acquired by the acquisition module 1901.

The analysis module 1902 is configured to analyze the gesture acquired by the acquisition module and acquire the first parameter information represented by the gesture, where, the first parameter information is used to indicate the direction of the gesture.

The instruction generation module 1903 is configured to generate a first instruction based on the first parameter information.

The operation execution module 1904 is configured to execute, in response to the first instruction, the operation corresponding to the gesture.

The Fourteenth Embodiment

Figure 20:
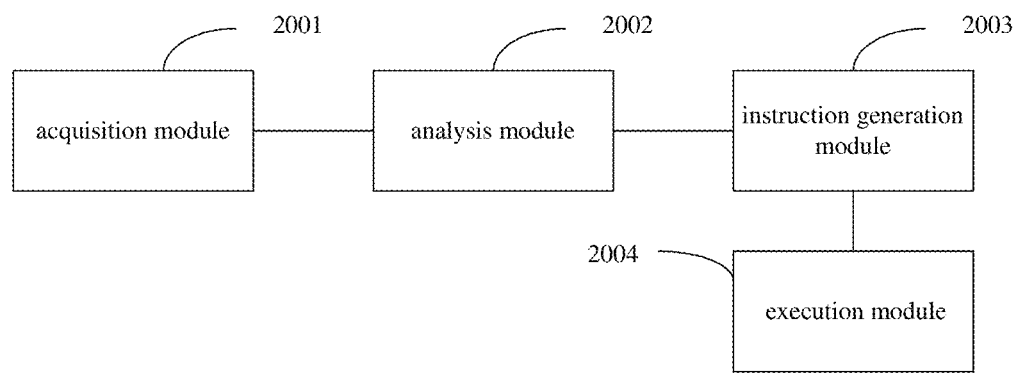
FIG. 20 is a structural diagram of an electronic device according to an embodiment of the present disclosure.

As shown in FIG. 20, an electronic device is further provided according to another embodiment of the present disclosure. The processing device includes: an acquisition module 2001, an analysis module 2002, an instruction generation module 2003 and an execution module 2004.

The acquisition module 2001 is configured to acquire a gesture in a specific region of space; where, the gesture is directional, and the specific region of space refers to the video region where video signals can be acquired by the acquisition module 2001.

The analysis module 2002 is configured to analyze the gesture acquired by the image acquisition unit, acquire the first parameter information represented by the gesture, and acquire, after the first parameter information represented by the gesture is acquire, the second parameter information represented by the gesture, where, the first parameter information is used to indicate the direction of the gesture, and the second parameter information is used to indicate the number of gestures with the same first parameter information.

The instruction generation module 2003 is configured to generate a first instruction based on the first parameter information and the second parameter information.

The execution module 2004 is configured to execute, in response to the first instruction, the operation corresponding to the gesture at the rate corresponding to the second parameter information.

The Fifteenth Embodiment

Figure 21:
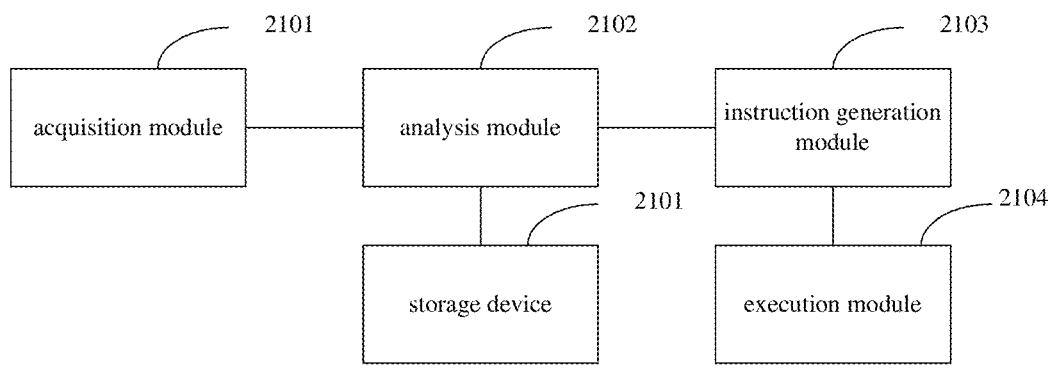
FIG. 21 is a structural diagram of an electronic device according to an embodiment of the present disclosure.

FIG. 21 illustrates an electronic device according to another embodiment provided in the present disclosure, where, the processing device includes: an acquisition module 2101, an analysis module 2102, an instruction generation module 2103, an execution module 2104 and a storage device 2105.

The storage unit 2105 stores at least one preset gesture; each preset gesture includes corresponding first parameter information.

The acquisition module 2101 is configured to acquire a gesture in a specific region of space; where, the gesture is directional, and the specific region of space refers to the video region where video signals can be acquired by the acquisition module 2101.

The analysis module 2102 is configured to match the gesture acquired by the image acquisition unit 2101 with at least one preset gesture stored by the storage device; if succeeded in matching, acquire the first parameter information corresponding to the preset gesture which is successfully matched with the gesture. And if failed in matching, terminate the work and notify the instruction generation module 2103 and the execution module 2104 of terminating the work, or re-match according to the gesture acquired by the acquisition module 2105, where, the first parameter is used to indicate the direction of the gesture.

The instruction generation module 2103 is configured to generate a first instruction based on the first parameter information.

The execution module 2104 is configured to execute, in response to the first instruction, the operation corresponding to the gesture.

The Sixteenth Embodiment

Figure 22:
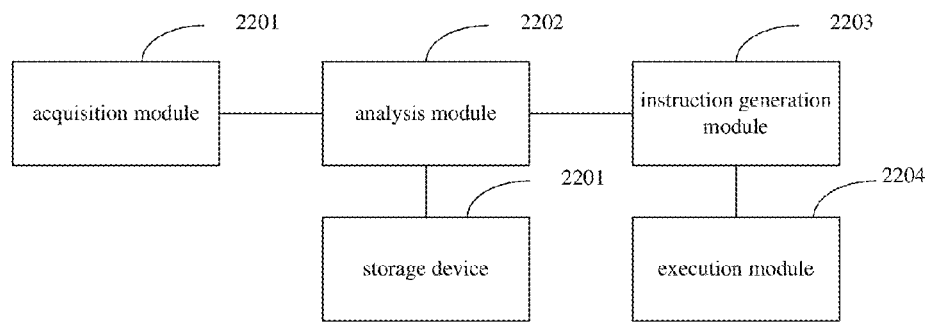
FIG. 22 is a structural diagram of an electronic device according to an embodiment of the present disclosure.

FIG. 22 illustrates a processing device according to another embodiment provided in the present disclosure, where, the processing device includes: an acquisition module 2201, an analysis module 2202, an instruction generation module 2203, an execution module 2204 and a storage device 2205.

The storage device 2205 stores preset direction intervals.

The acquisition module 2201 is configured to acquire a gesture in a specific region of space; where, the gesture is directional, and the specific region of space refers to the video region where video signals can be acquired by the acquisition module 2201.

The analysis module 2202 is configured to analyze the gesture acquired by the acquisition module 2201 according to the preset direction intervals stored by the storage unit 2201, and acquired the first parameter information represented by the gesture, where, the first parameter information is configured to indicate the direction of the gesture.

The instruction generation module 2203 is configured to generate a first instruction based on the first parameter information.

The execution module 2204 is configured to execute, in response to the first instruction, the operation corresponding to the gesture.

The processing device provided in the present disclosure is a device corresponding to a processing method, which is omitted here, and details of which may be referred to the processing method according to embodiments provided in the present disclosure.

In the case where the technical solution is applied to controlling the camera, the electronic device may have a structure as described in the following embodiments.

Figure 23:
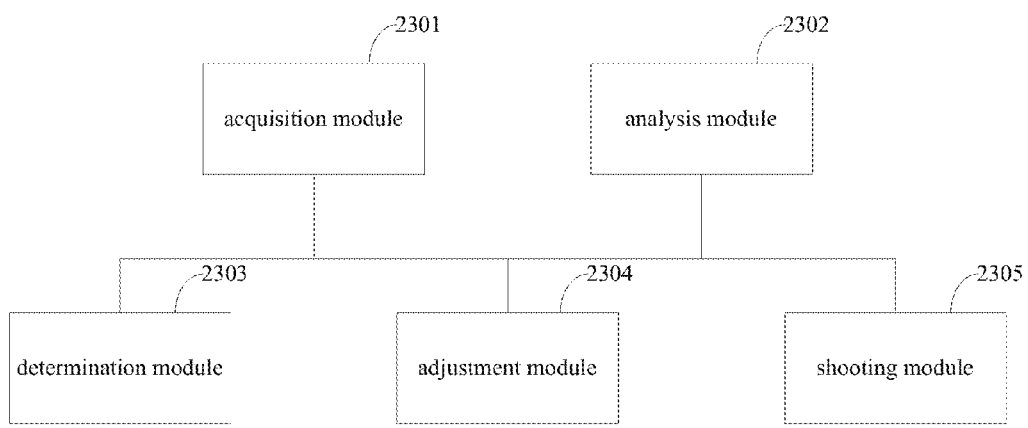
FIG. 23 is a structural diagram of an electronic device according to an embodiment of the present disclosure.

Referring to FIG. 23, an electronic device is provided according to the present disclosure. The electronic device may contain an image acquisition unit. The electronic device may further include an acquisition module 2301, an analysis module 2302, a determination module 2303 and an adjustment module 2304. Preferably, the electronic device may further include a shooting module 2305.

In the embodiments of the present disclosure, the electronic device may be a device which includes an image acquisition unit, such as intelligent glasses, mobile phones, or a PAD, etc.

An acquisition module 2301 may be configured to acquire a first image which contains an instruction object by an image acquisition unit.

The acquisition module 2301 may specifically be configured to acquire the first image which contains an object by the image acquisition unit; and determine the object as the instruction object.

In the embodiment of the present disclosure, the instruction object may be a hand.

An analysis module 2302 may be configured to analyze the first image, and acquire the first direction corresponding to the instruction object.

The analysis module 2302 may be further configured to acquire the gesture information of the hand; determine the direction where the line extending from the middle of the two eyes of a person to the first end of the gesture corresponding to the gesture information points as the first direction.

A determination module 2303 may be configured to determine the first target corresponding to the first direction in the image acquisition area of the image acquisition unit.

The determination module 2303 may be specifically configured to determine the extended line to the line extending from the middle of the two eyes of a person to the first end of the gesture corresponding to the gesture information, and determine the shooting target that intersects with the extended line in the image acquisition area as the first target.

In the embodiments of the disclosure, the determination module 2303 may include a first determination sub-module 23031, a second determination sub-module 23032 and a third determination sub-module 23033.

The first determination sub-module 23031 may be configured to determine an extended line to the line extending from the middle of the two eyes of a person to the first end of the gesture corresponding to the gesture information.

The second determination sub-module 23032 may be configured to determine the number of shooting targets that intersect with the extended line in the image acquisition area.

The second determination sub-module 23032 may be configured to determine at least two times respectively within a first period of time the shooting targets corresponding to the first direction in the image acquisition area of the image acquisition unit.

The third determination sub-module 23033 may be configured to determine, in the case where the number of the shooting targets is more than one, the shooting target among all the shooting targets that is closest to the electronic device as the first target.

The third determination sub-module 23033 may be configured to choose one of at least two shooting targets as the first target.

The third determination sub-module 23033 may be configured to acquire, from at least two of the determined shooting targets, the one that is most frequently determined, and determine the acquired shooting target that is most frequently determined as the first target.

An adjustment module 2304 may be configured to adjust the focusing point of the image acquisition unit to the first target.

A shooting module 2305 may be configured to preview the image acquisition area or take a picture.

The method for adjusting focusing point provided in the embodiments of the present disclosure may be applied to an electronic device which contains an image acquisition unit. The method may include: acquiring a first image which contains an instruction object by the image acquisition unit; analyzing the first image and acquiring the first direction information corresponding to the instruction object; determining the first target corresponding to the first direction information in the image acquisition area of the image acquisition unit; and adjusting the focusing point of the image acquisition unit to the first target.

When there is such an instruction object in the image acquisition area of the image acquisition unit, the first target in the image acquisition area may be determined according to the direction where the instruction object points, and that the focusing point may be determined to be adjusted to the first target. In this way, focusing point may be adjusted by instruction information such as a gesture, which not only solves the technical problem of incapable of focusing that existed in the prior art, but also provides such a simple way of implementation. The user no longer needs to remember all those complex operations. Simply pointing by a hand or any other instructing object at the target to be shot may be able to adjust the focusing point to the target. As what the user looks at in shooting is the view in stead of the screen, the process of adjusting the focusing point becomes more accurate. Utilization of technical solutions provided in the present disclosure not only improves the shooting quality due to the capability of focusing adjustment, but also enhances the shooting efficiency for the user to obtain his favorable image as soon as possible, which therefore improves the user experience.

In the embodiments of the present disclosure, if several shooting targets are determined according to the first direction, then among several shooting targets, one shooting target may be chosen as the first target. For example, any one of the several shooting targets may be chosen as the first target, which can be easily achieved; or, among several shooting targets, the shooting target that is closest to the electronic equipment can be chosen as the first target, which may suits more to the user's demand, and make it easier to get a clear shoot and obtain a picture of higher quality.

In the embodiments of the present disclosure, the shooting target may be determined for several times. Since a hand of a user may not be steady when giving an instruction, if only one chance is allowed, a wrong instruction may just be incurred by an unsteady hand of a user, and that the first target determined may not be the one that a user favors, while by way of determining for several times, a wrong operation may be effectively avoided.

Those with ordinary skills in the art shall understand that what can be provided in the embodiments of the present disclosure is a method, system or computer program product. Therefore, the form of all hard-ware embodiments, all soft-ware embodiments or embodiments in a combination of hard-wares and soft-wares may be adopted by the present invention. Besides, the form of a computer program product implemented on one or more computer applicable storage media (including but not limited to magnetic disk memory and optical memory) which contains computer applicable program codes may be adopted by the present invention.

The present disclosure is illustrated in details in conjunction with the flow chart and/or the block diagram of the method, device (system) and computer program products according to the embodiments of the present invention. It should be understood that each flow and/or block in the flow chart and/or block diagram or the combination of the flow and/or block in the flow chart and/or block diagram may be achieved by computer program instructions. These computer program instructions can be provided to a processor of a generalized computer, a specialized computer, an embedded processor or other programmable data processing device to generate a machine, so that a device configured to achieve functions designated in one or more flows in a flow chart and/or one or more block in a block diagram may be generated by instructions implemented by the processor of a computer or other programmable data processing device.

These computer program instructions can also be stored at computer readable memories which can conduct the computer or other programmable data processing device to work in a specific manner, so that a product which contains an instruction device may be generated by instructions stored at the computer readable memories, and functions designated in one or more flows in a flow chart and/or one or more block in a block diagram may be achieved by the instruction device.

These computer program instructions can also be loaded onto a computer or other programmable data processing device so that a series of operating steps may be implemented in the computer or other programmable device to conduct the processing achieved by the computer, so that steps for achieving functions designated by one or more flows in a flow chart and/or one or more block in a block diagram may be provided through the instructions implemented in the computer or other programmable device.

Obviously, various alterations or variations to the present disclosure may be made by those with skills in the art within the spirit and principle of the present invention. If these alterations or variations are covered by the claims of the present disclosure or the scope of any equivalent technologies, these alterations or variations are also intended to be included in the present disclosure.

The invention claimed is:

1. A processing method, applied to an electronic device comprising an image acquisition unit, comprising:
   acquiring a first image which contains an instruction object by the image acquisition unit, wherein the instruction object is directional;
   analyzing the first image and acquiring first parameter information represented by the instruction object, wherein the first parameter information indicates a direction of the instruction object;
   generating a first instruction based on the first parameter information; and
   executing, in response to the first instruction, an operation corresponding to the instruction object;
   wherein generating the first instruction based on the first parameter information comprises determining a first direction corresponding to the instruction object according to the direction of the instruction object, and a first target corresponding to the first direction in an image acquisition area of the image acquisition unit; and
   wherein executing, in response to the first instruction, the operation corresponding to the instruction object comprises adjusting a focusing point of the image acquisition unit to the first target.

2. The method according to claim 1, wherein the instruction object is a hand.

3. The method according to claim 2, wherein determining the first direction corresponding to the instruction object according to the direction of the instruction object comprises:
acquiring gesture information indicating where the hand points; and
determining the first direction based on a line extending from a middle of two eyes of a person to a first end of where the hand points as indicated by the gesture information.

4. The method according to claim 2, wherein before determining the first target corresponding to the first direction in the image acquisition area of the image acquisition unit, the method further comprises:
determining an extension of a line extending from a middle of two eyes of a person to a first end of where the hand points as indicated by the gesture information; and
determining a number of shooting targets that intersect with the extension of the line in the image acquisition area;
wherein the determining a first target corresponding to the first direction in the image acquisition area of the image acquisition unit comprises:
in a case where the number of the shooting targets is more than one, determining a shooting target that is closest to the electronic device from the shooting targets as the first target.

5. The method according to claim 1, wherein the determining a first target corresponding to the first direction in an image acquisition area of the image acquisition unit comprises:
determining at least twice within a first period of time shooting targets corresponding to the first direction in the image acquisition area of the image acquisition unit; and
selecting one of the determined shooting targets as the first target.

6. The method according to claim 5, wherein selecting one of the determined shooting targets as the first target comprises:
determining a shooting target which is most frequently determined within the first period of time as the first target.

7. The method according to claim 1, wherein after the adjusting the focusing point of the image acquisition unit to the first target, the method further comprises:
previewing a shooting for the image acquisition area or taking a picture.

8. An electronic device, comprising an image acquisition unit, wherein the electronic device further comprises:
an acquisition module, configured to acquire a first image containing an instruction object, wherein the instruction object is directional;
an analysis module, configured to analyze the first image, and acquire first parameter information represented by the instruction object, wherein the first parameter information indicates a direction of the instruction object;
an instruction generating module, configured to determine a first direction corresponding to the instruction object according to the direction of the instruction object, and a first target corresponding to the first direction in an image acquisition area of the image acquisition unit; and
an execution module, configured to adjust a focusing point of the image acquisition unit to the first target.

9. The electronic device according to claim 8, wherein the instruction object is a hand.

10. The electronic device according to claim 9, wherein the analysis module is configured to
acquire gesture information indicating where the hand points; and
determine the first direction based on a line extending from a middle of two eyes of a person to a first end of where the hand points as indicated by the gesture information.

11. The electronic device according to claim 9 further comprising an instruction generation module configured to
determine an extension of a line extending from a middle of two eyes of a person to a first end of where the hand points as indicated by the gesture information; and
determine a number of shooting targets that intersect with the extension of the line in the image acquisition area.

12. The electronic device according to claim 11, wherein the instruction generation module comprises:
a first determination sub-module, configured to determine the extension of the line extending from the middle of the two eyes of the person to the first end of where the hand points as indicated by the gesture information;
a second determination sub-module, configured to determine the number of the shooting targets that intersect with the extension of the line in the image acquisition area; and
a third determination sub-module, configured to determine a shooting target that is closest to the electronic device as the first target, from the shooting targets, in a case where the number of the shooting targets is more than 1.

13. The electronic device according to claim 8, further comprising an instruction generation module including:
a second determination sub-module, configured to determine, at least twice within a first period of time, shooting targets corresponding to the first direction in the image acquisition area of the image acquisition unit; and
a third determination sub-module, configured to select one of the determined shooting targets as the first target.

14. The electronic device according to claim 13, wherein the third determination sub-module is configured determine the shooting target which is most frequently determined within the first period of time as the first target.

15. The electronic device according to claim 8, further comprising:
a shooting module, configured to preview a shooting for the image acquisition area or take a picture.

* * * * *